United States Patent
Hashiguchi

(10) Patent No.: US 10,303,298 B2
(45) Date of Patent: May 28, 2019

(54) TOUCH SCREEN, TOUCH PANEL, DISPLAY DEVICE, AND ELECTRONIC DEVICE

(71) Applicant: Mitsubishi Electric Corporation, Tokyo (JP)

(72) Inventor: Takafumi Hashiguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 215 days.

(21) Appl. No.: 15/343,770

(22) Filed: Nov. 4, 2016

(65) Prior Publication Data

US 2017/0131842 A1  May 11, 2017

(30) Foreign Application Priority Data

Nov. 9, 2015 (JP) .................. 2015-219262

(51) Int. Cl.
 *G06F 3/041* (2006.01)
 *G06F 3/044* (2006.01)
 *G02F 1/1333* (2006.01)

(52) U.S. Cl.
 CPC ........ *G06F 3/0418* (2013.01); *G02F 1/13338* (2013.01); *G06F 3/044* (2013.01); *G06F 3/0412* (2013.01); *G06F 3/0416* (2013.01); *G06F 2203/04107* (2013.01); *G06F 2203/04111* (2013.01)

(58) Field of Classification Search
 CPC ...... G06F 3/0412; G06F 3/0418; G06F 3/044; G06F 3/0416; G06F 2203/04111; G06F 2203/04107
 See application file for complete search history.

(56) References Cited

U.S. PATENT DOCUMENTS

| 5,844,506 A | 12/1998 | Binstead |
| 6,137,427 A | 10/2000 | Binstead |
| 6,288,707 B1* | 9/2001 | Philipp ................. G06F 3/0213 |
| | | 341/22 |
| 6,452,514 B1 | 9/2002 | Philipp |
| RE40,867 E | 8/2009 | Binstead |
| 9,295,176 B2 | 3/2016 | Ohtani et al. |
| 2013/0242485 A1* | 9/2013 | Ohtani .................... G06F 3/041 |
| | | 361/679.01 |

FOREIGN PATENT DOCUMENTS

| JP | H09-511086 A | 11/1997 |
| JP | 2003-526831 A | 9/2003 |
| JP | 2012-103761 A | 5/2012 |
| WO | 95/27334 A1 | 10/1995 |
| WO | 00/044018 A1 | 7/2000 |

* cited by examiner

*Primary Examiner* — Vijay Shankar
(74) *Attorney, Agent, or Firm* — Studebaker & Brackett PC

(57) ABSTRACT

A touch screen includes column-direction wirings extending in a column direction, row-direction wirings extending in a row direction orthogonal to the column direction, and detection cells provided in areas in which the column-direction wirings and the row-direction wirings are three-dimensionally intersect with each other. The touch screen further includes additional capacitors that are provided in a mounting region in which mounting terminals of a plurality of lead lines, each of which is connected to one of the column-direction wirings or one of the row-direction wirings, are mounted, and are configured to apply electrostatic capacitance to the plurality of lead lines, and at least one potential fixed terminal configured to fix a potential of one electrode of each of the additional capacitors.

11 Claims, 17 Drawing Sheets

TOUCH SCREEN, TOUCH PANEL, DISPLAY DEVICE, AND ELECTRONIC DEVICE

BACKGROUND OF THE INVENTION

Field of the Invention

The present invention relates to a touch screen, a touch panel including the touch screen, a display device and an electronic device including the touch panel.

Description of the Background Art

A touch panel is a device for detecting a touch with an indicator such as a finger and determining the position coordinates of the touched position on the touch panel, and has been attracting attention as one of excellent user interfaces. Nowadays, various types of touch panels have been commercialized, such as resistive touch panels, capacitive touch panels and the like. Generally, a touch panel includes a touch screen incorporating a touch sensor (a sensor for detecting a touch), and a detecting device that determines the position coordinates of the touched position based on a signal input from the touch screen.

As one type of the capacitive touch panels, projected capacitive touch panels are known (for example, Japanese Patent Application Laid-Open No. 2012-103761). A projected capacitive touch panel as disclosed in Japanese Patent Application Laid-Open No. 2012-103761 can detect a touch even when a glass plate, which has a thickness of about several millimeters, covers the front surface of a touch screen incorporating a touch sensor. Such a projected capacitive touch panel is capable of including a protective plate on the front surface of a touch screen, and thus excels in durability. In addition, even when a user wearing gloves touches a screen, a projected capacitive touch panel can detect a touch. Moreover, without movable portions, a projected capacitive touch panel has a long service life, since potential problems caused by movable portions can be avoided.

A projected capacitive touch panel includes, for example, a first series of conductive elements formed on a thin dielectric film and a second series of conductive elements formed above the first series of conductive elements through an insulation film as detection wirings for detecting a capacitance. The first and second series of conductive elements form a plurality of intersections without electrically contacting with each other.

According to a structure disclosed in Japanese Unexamined Patent Application Publication (Translation of PCT Application) No. H09-511086 (1997), a detection circuit detects a capacitance formed between an indicator, such as a finger, and the first series of conductive elements and second series of conductive elements, which are detection wirings, to determine the position coordinates of a position touched by the indicator. Such a method of detecting the position coordinates is generally called a self-capacitance system.

For example, a change in a mutual capacitance, specifically, a change in an electric field between a plurality of row wirings extending in a row direction, which form first electrodes, and a plurality of column wirings extending in a column direction, which form second wirings is detected to determine the position coordinates of the touched position (see Japanese Unexamined Patent Application Publication (Translation of PCT Application) No. 2003-526831, for example). Such a detection method is generally called a mutual-capacitance system.

In either of the above self-capacitance system and mutual-capacitance system, a method is generally employed in which when a planar region (detection cell) divided into a grid pattern by the row wirings and the column wirings is touched by an indicator such as a finger, the position coordinates of the touched position are determined based on a balance between a detection value of the touched detection cell (sensor block) and a detection value of a detection cell near the sensor block.

Sensor capacitors are generally formed by row-direction wirings and column-direction wirings. It is ideal that sensor capacitors are formed such that electrostatic capacitance values of all pairs of sensor capacitors are equal to each other in a state in which no physical quantity acts on the sensor capacitors. However, when a touch panel is used in combination with a display module, such as a liquid crystal display (LCD), a parasitic capacitance is excessively formed between lead lines outside the touch screen and a display module such as an LCD, and thus an offset occurs in an electrostatic capacitance of the sensor capacitors even in a state in which no physical quantity acts on the touch screen.

Specifically, when a touch panel is mounted on an LCD having a front frame, capacitive coupling between the outermost one of lead lines, which surround the outer periphery of a detection area, and the front frame becomes larger than capacitive coupling between the other lead lines and the front frame, and thus an offset occurs in an electrostatic capacitance of the sensor capacitors. As a result, a dynamic range of a controller (a circuit that performs detection of a touch capacitance of each detection wiring, and the like) commonly connected to the lead lines is entirely reduced, and thus detection sensitivity of the detection wiring connected to the outermost lead line having a capacitance larger than the other lead lines may be degraded or disabled.

It is hard to distinguish between an offset of the electrostatic capacitance described above and a difference of the electrostatic capacitance caused by an action of a physical quantity in the output voltage of a projected capacitive touch screen, and this causes a detection error of a physical quantity.

SUMMARY OF THE INVENTION

The present invention provides a technique capable of reducing an offset of electrostatic capacitance among detection cells and suppressing unevenness of the detection sensitivity.

A touch screen according to an aspect of the present invention includes column-direction wirings extending in a column direction, row-direction wirings extending in a row direction orthogonal to the column direction, and detection cells provided in areas in which the column-direction wirings and the row-direction wirings are three-dimensionally intersect with each other. The touch screen further includes additional capacitors that are provided in a mounting region in which mounting terminals of a plurality of lead lines, each of which is connected to one of the column-direction wirings or one of the row-direction wirings, are mounted, and are configured to apply electrostatic capacitance to the plurality of lead lines, and at least one potential fixed terminal configured to fix a potential of one electrode of each of the additional capacitors.

The touch screen according to an aspect of the present invention can reduce an offset of electrostatic capacitance among detection cells and suppress unevenness of the detection sensitivity.

These and other objects, features, aspects and advantages of the present invention will become more apparent from the

DESCRIPTION OF THE PREFERRED EMBODIMENTS

<Layer Structure of Touch Screen>

A layer structure of a touch screen according to the present invention will be described below with reference to FIGS. 1 and 2. In the following description, a projected capacitive touch screen is taken as an example.

Figure 1:
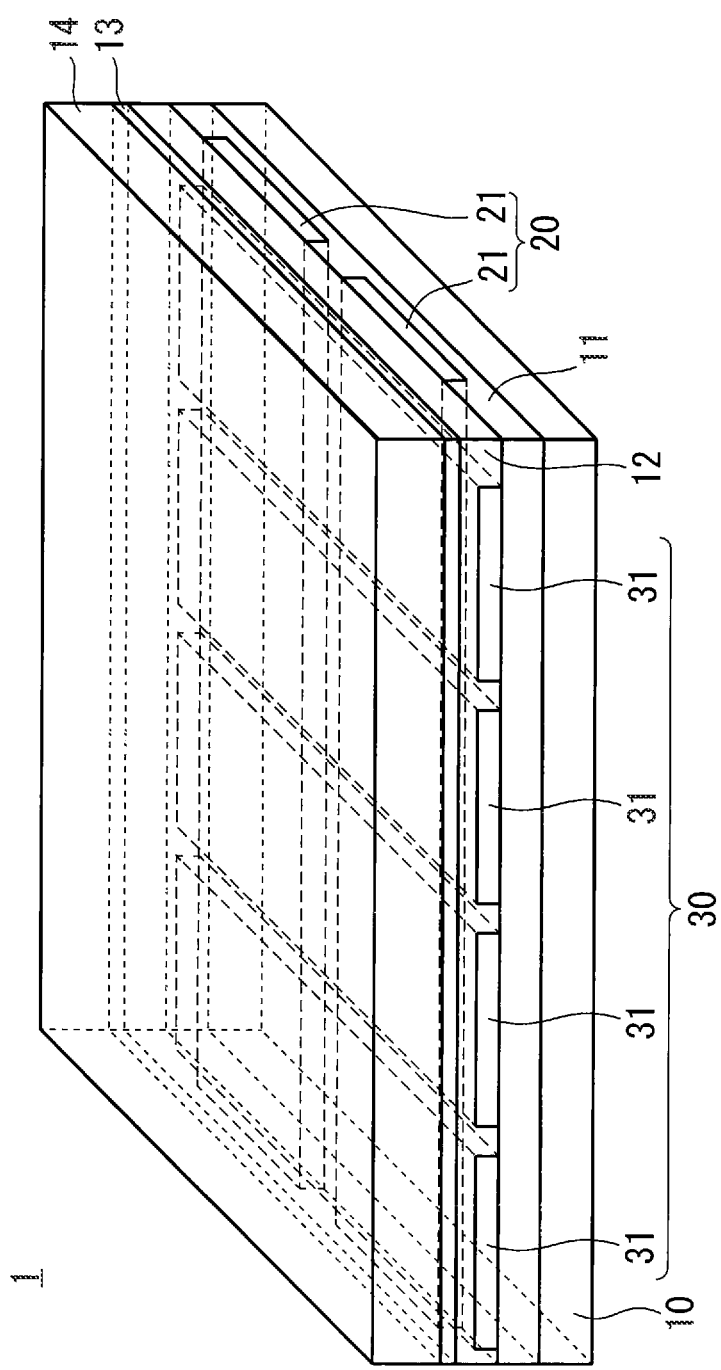
FIG. 1 is a perspective view illustrating a layer structure of a touch screen.

FIG. 1 is a perspective view of a layer structure of a touch screen 1 according to the present invention, and shows a part of the touch screen 1 as a cut-out state. A transparent substrate 10 formed of a transparent glass material or a transparent resin is provided as the lowermost layer of the touch screen 1 shown in FIG. 1. A lower electrode 20 is provided above the transparent substrate 10, and an interlayer insulating film 11 is provided to cover the lower electrode 20. The interlayer insulating film 11 is formed of a transparent (translucent) insulating film, such as a silicon nitride film or a silicon oxide film.

An upper electrode 30 is provided on the interlayer insulating film 11 so as to extend in a direction orthogonal to the lower electrode 20, and a protective film 12 is provided to cover the upper electrode 30. The protective film 12 is formed of a transparent insulating film such as a silicon nitride film or a silicon oxide film in the same manner as in the case of the interlayer insulating film 11.

A polarizing plate 13 for a liquid crystal display (LCD), to which the touch screen 1 is mounted, is provided on (attached to) the protective film 12. A transparent substrate 14 formed of a transparent glass material or a transparent resin is provided on (attached to) the polarizing plate 13 to protect the touch screen 1.

The lower electrode 20 includes a plurality of row-direction wirings 21 formed of a transparent wiring material such as indium tin oxide (ITO), or a metal wiring material such as aluminum or copper. The upper electrode 30 includes a plurality of column-direction wirings 31 formed of a transparent wiring material such as ITO, or a metal wiring material such as aluminum or copper, in the same manner as in the case of the row-direction wirings 21.

Note that each of the column-direction wirings 31 and the row-direction wirings 21 are configured to have a multilayer structure including an aluminum-based alloy layer and its nitride layer. This makes it possible to reduce wiring resistance and also reduce a reflectance of light in a detectable area. The detectable area used herein refers to an area in the touch screen 1 where a touch with an indicator such as a finger can be detected.

FIG. 1 shows a structure in which the column-direction wirings 31 are situated in an upper layer of the row-direction wirings 21, but the positional relationship may be inverted in such a manner that the row-direction wirings 21 are situated in an upper layer of the column-direction wirings 31.

The column-direction wirings 31 and the row-direction wirings 21 are described as a multilayer structure including an aluminum-based alloy layer and its nitride layer, but are not limited thereto. For example, the column-direction wirings 31 may be configured to have a multilayer structure including an aluminum-based alloy layer and its nitride layer and the row-direction wirings 21 may be formed of a transparent wiring material such as ITO.

The column-direction wirings 31 and the row-direction wirings 21 may be disposed on the same layer and electrically separated from each other by providing interlayer insulating films 11 only at positions where the column-direction wirings 31 and the row-direction wirings 21 overlap in a plan view (three-dimensionally intersect) with each other.

A user touches the transparent substrate 14, which is a front surface of the touch screen 1, with an indicator such as a finger for operation. When the indicator contacts (touches) the transparent substrate 14, a capacitive coupling occurs (touch capacitance is produced) between the column-direction wirings 31 and the row-direction wirings 21. In the mutual-capacitance system, when the touch capacitance is produced, a change in the mutual capacitance between an upper-layer electrode and a lower-layer electrode is detected to determine which position in the detectable area is touched.

Figure 2:
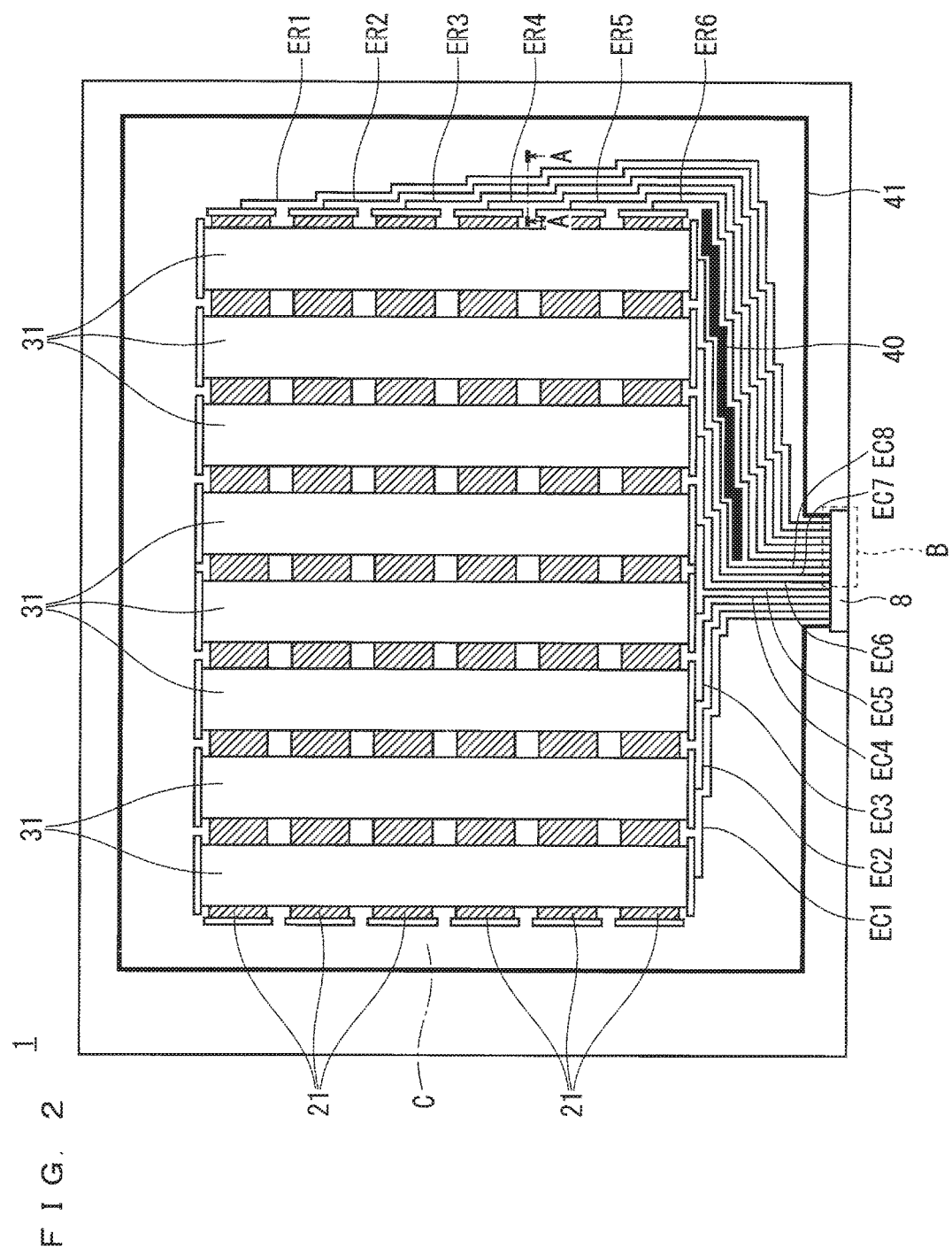
FIG. 2 is a plan view illustrating a structure of the touch screen.

FIG. 2 is a plan view illustrating one example of a structure of the touch screen 1. The detectable area in the touch screen 1 is a matrix area formed by the plurality of row-direction wirings 21 extending in the row direction (lateral direction in the figure) and the plurality of column-direction wirings 31 extending in the column direction (vertical direction in the figure) above the row-direction wirings 21.

The row-direction wirings 21 are connected to a terminal 8 that is configured to be electrically connected with an external wiring through lead lines ER1 to ER6. The column-direction wirings 31 are connected to the terminal 8 through lead lines EC1 to EC8. Note that each of the areas where the row-direction wirings 21 and the column-direction wirings 31 overlap in a plan view (three-dimensionally intersect) with each other in FIG. 2 corresponds to a detection cell.

The lead lines ER1 to ER6 and the lead lines EC1 to EC8 are packed together to be arranged in an outer peripheral side of the detectable area. The lead lines ER1 to ER6 are arranged such that the shortest lead line ER6 is situated at the innermost side, the longest lead line ER1 (outermost lead line) is situated at the outermost side, and the other lead lines ER2 to ER5 are situated between the lead lines ER6 and ER1. The lead lines EC1 to EC8 are arranged such that the lead lines EC1 to EC4 extending in the row direction, from the lead line EC4 connected with closest one of the column-direction wirings 31 to the terminal 8 to the lead line EC1 connected with farthest one of the column-direction wirings 31 from the terminal 8, are packed together to be arranged in the outer peripheral side of the detectable area, and the lead lines EC5 to EC8 extending in the row direction, from the lead line EC5 connected with closest one of the column-direction wirings 31 to the terminal 8 to the lead line EC8 connected with farthest one of the column-direction wirings 31 from the terminal 8, are packed together to be arranged in the outer peripheral side of the detectable area.

As described above, the lead lines ER1 to ER6 and the lead lines EC1 to EC8 are packed to be arranged in the outer peripheral side of the detectable area. This structure makes it possible to suppress fringe capacitance produced between the display device, on which the touch screen 1 is mounted, and the lead lines E (lead lines ER2 to ER6, lead lines EC2 to EC8) excluding the outermost lead lines ER1 and EC1.

A shielded wire 40, to which a reference potential such as a ground potential is applied, is provided at a portion where the lead line EC8 connected with one of the column-direction wirings 31 and the lead line ER6 connected with one of the row-direction wirings 21 are arranged in parallel, between the lead lines EC8 and ER6.

Since the shielded wire 40 is provided as described above, a crosstalk capacitance between the lead line EC8 and the lead line ER6 can be reduced significantly, and thus a misdetection can be prevented even when the indicator such as the finger touches this portion.

In addition, an outermost shielded wire 41, to which a ground potential is input, is provided at the outside of the outermost lead lines ER1 and EC1 with the detectable area.

Since the outermost shielded wire 41 is provided as described above, an electromagnetic noise intruded from the outside can be absorbed, and thus degradation of the detection performance due to the electromagnetic noise can be prevented.

Not shown in FIGS. 1 and 2 for simplicity, the row-direction wirings 21 and the column-direction wirings 31 are formed of a plurality of conductive wires.

Figure 3:
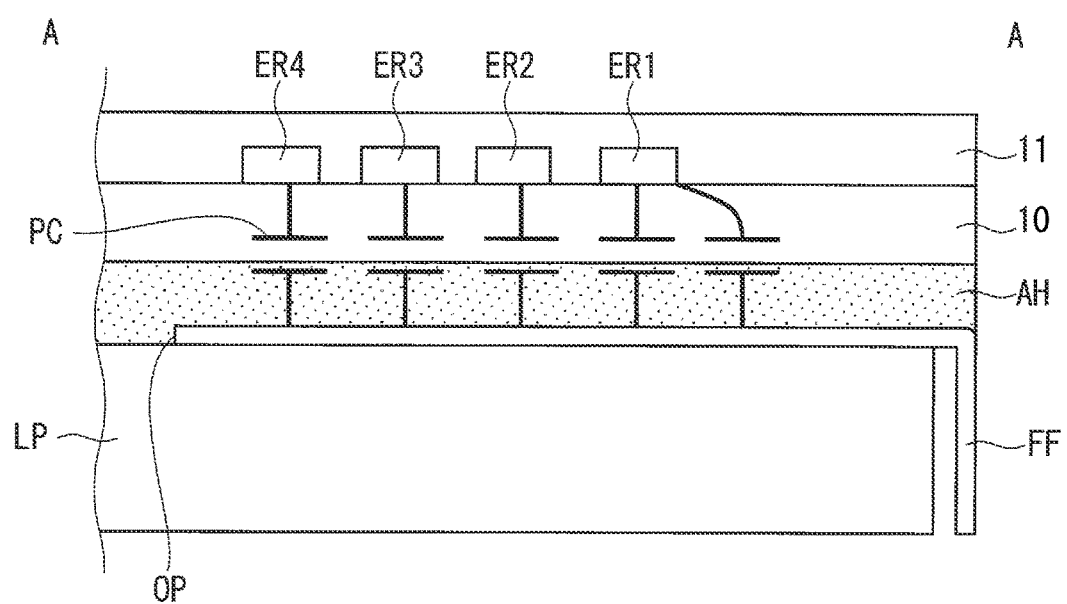
FIG. 3 is a sectional view illustrating a state in which the touch screen is mounted on an LCD having a front frame.

FIG. 3 is a sectional view taken along the line A-A as viewed in a direction of the arrows in FIG. 2, and shows a state in which the touch screen 1 having the above-described structure is attached to an LCD having a front frame. FIG. 3 shows only the transparent substrate 10 and the interlayer insulating film 11 as a structure of the touch screen 1, for easy understanding.

As shown in FIG. 3, a front frame FF covers the front side of a liquid crystal panel LP of the LCD. The front frame FF houses the liquid crystal panel LP such that an opening OP corresponds to a display area of the liquid crystal panel LP, and the periphery of the opening OP is covered by the front frame FF which has conductivity and is grounded. The front frame FF and the touch screen 1 are bonded to each other through an adhesive layer AH, and a capacitive coupling occurs between each of the lead lines ER1 to ER4 of the touch screen 1 and the front frame FF to produce a parasitic capacitance PC.

Particularly, as shown in FIG. 3, the parasitic capacitance PC between the outermost lead line ER1 and the front frame FF becomes larger than the parasitic capacitance PC between each of the other lead lines and the front frame FF.

Figure 4:
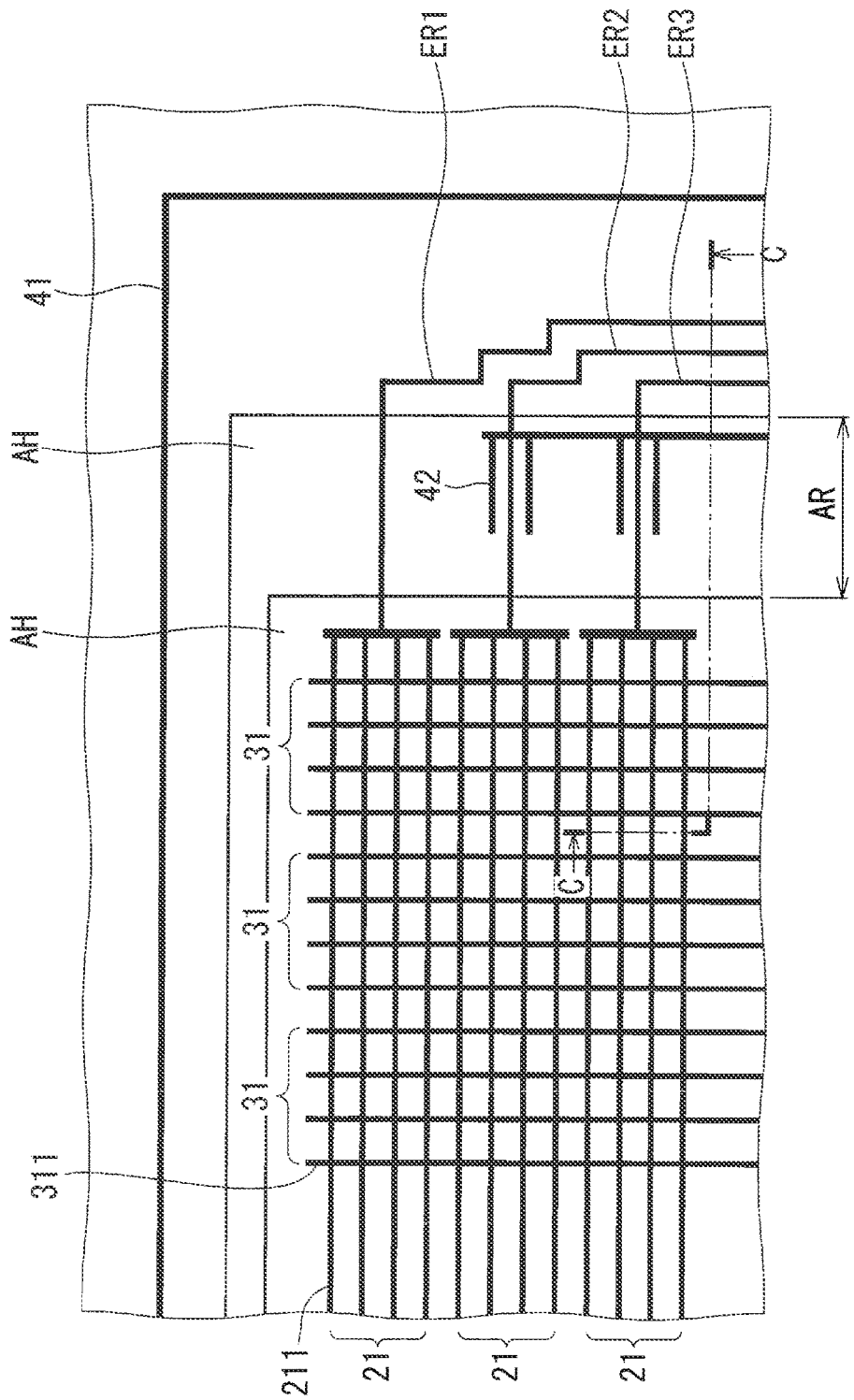
FIG. 4 is a plan view illustrating a structure in which an area for adjusting electrostatic capacitance is provided in a frame region.

In order to avoid such a situation, a structure in which a region for adjusting an electrostatic capacitance is provided in a frame region around the display area has been invented. FIG. 4 is a plan view showing such a structure in which a region for adjusting an electrostatic capacitance is provided in the frame region.

FIG. 4 partially shows a state in which the touch screen 1 is mounted on the front frame FE, and illustrates the lead lines ER1 to ER3, the row-direction wirings 21 connected with the lead lines ER1 to ER3, and a plurality of the column-direction wirings 31. Each of the row-direction wirings 21 includes a plurality of wirings 211 and each of the column-direction wirings 31 includes a plurality of wirings 311. Note that the row-direction wirings 21 and the column-direction wirings 31 are not limited to the above form, and may be configured by mesh-shaped wirings, for example.

Figure 5:
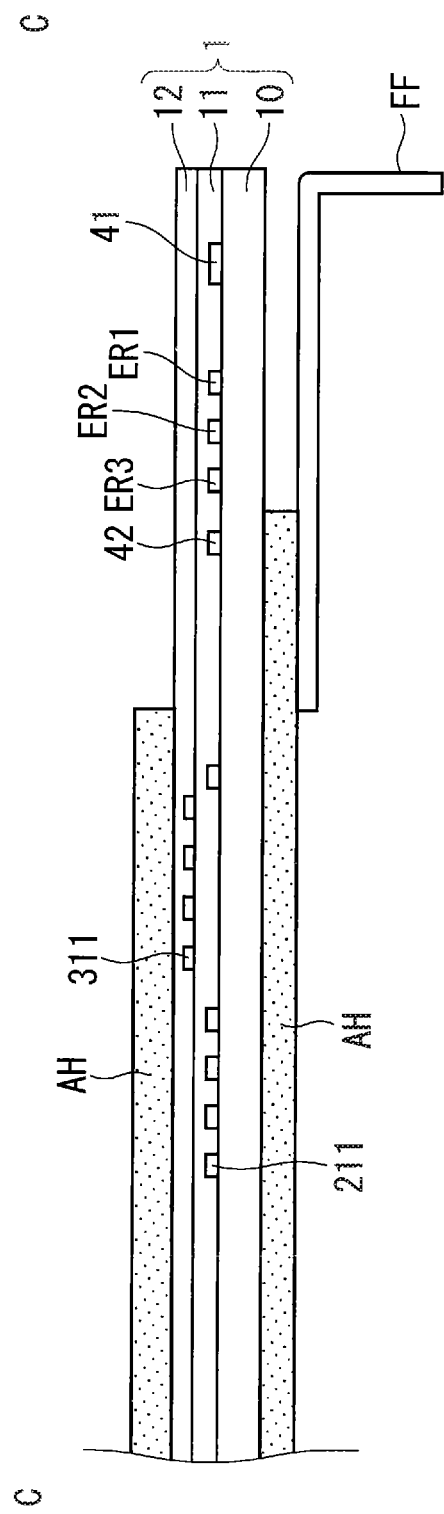
FIG. 5 is a sectional view illustrating the structure in which the area for adjusting electrostatic capacitance is provided in the frame region.

FIG. 5 is a view showing a cross section taken along the line C-C as viewed in the direction of the arrows in FIG. 4. The front frame FF and the touch screen 1 are bonded to each other through the adhesive layer AH. The adhesive layer AH is also provided on the protective film 12, and the polarizing plate 13 (not shown) is bonded to the adhesive layer AH.

In order to adjust the parasitic capacitance so that the parasitic capacitance between the outermost lead line ER1 and the front frame FF and the parasitic capacitance between the other lead lines and the front frame FF coincide with each other, an additional capacitor wiring 42 is provided on each of the lead lines ER2 and ER3 to run parallel to a part of each of the lead lines ER2 and ER3, as shown in FIG. 4. The additional capacitor wiring 42 includes parallel-line-parts each of which sandwiches one of the lead lines ER2 and ER3, and a common-line-part to which the parallel-line-parts are commonly connected. A common potential is applied to the common-line-part. The additional capacitor wiring 42 is provided on each of the lead lines ER2 to ER6 to increase the parasitic capacitance between each of the lead lines ER2 to ER6 and the front frame FF, thereby reducing a deviation from the parasitic capacitance between the lead line ER1 and the front frame FF. This solves an offset of the electrostatic capacitance among the sensor capacitors.

However, since the additional capacitor wiring 42 is provided for adjusting the electrostatic capacitance, it becomes necessary to provide a capacitance adjusting region AR in the frame region, and in addition, it becomes necessary to increase the lengths of the lead lines thus increasing the wiring resistance.

First Preferred Embodiment

A structure of a touch screen 1 according to a first preferred embodiment will be described below with reference to FIGS. 2, 6 and 7. In FIG. 2, the lateral direction in the figure is defined as a row direction, and the vertical direction in the figure is defined as a column direction. FIG. 2 schematically shows a structure of the row-direction wirings 21 and the column-direction wirings 31, and the thickness and intervals of arrangement of the wirings are different from the actual structure.

Figure 6:
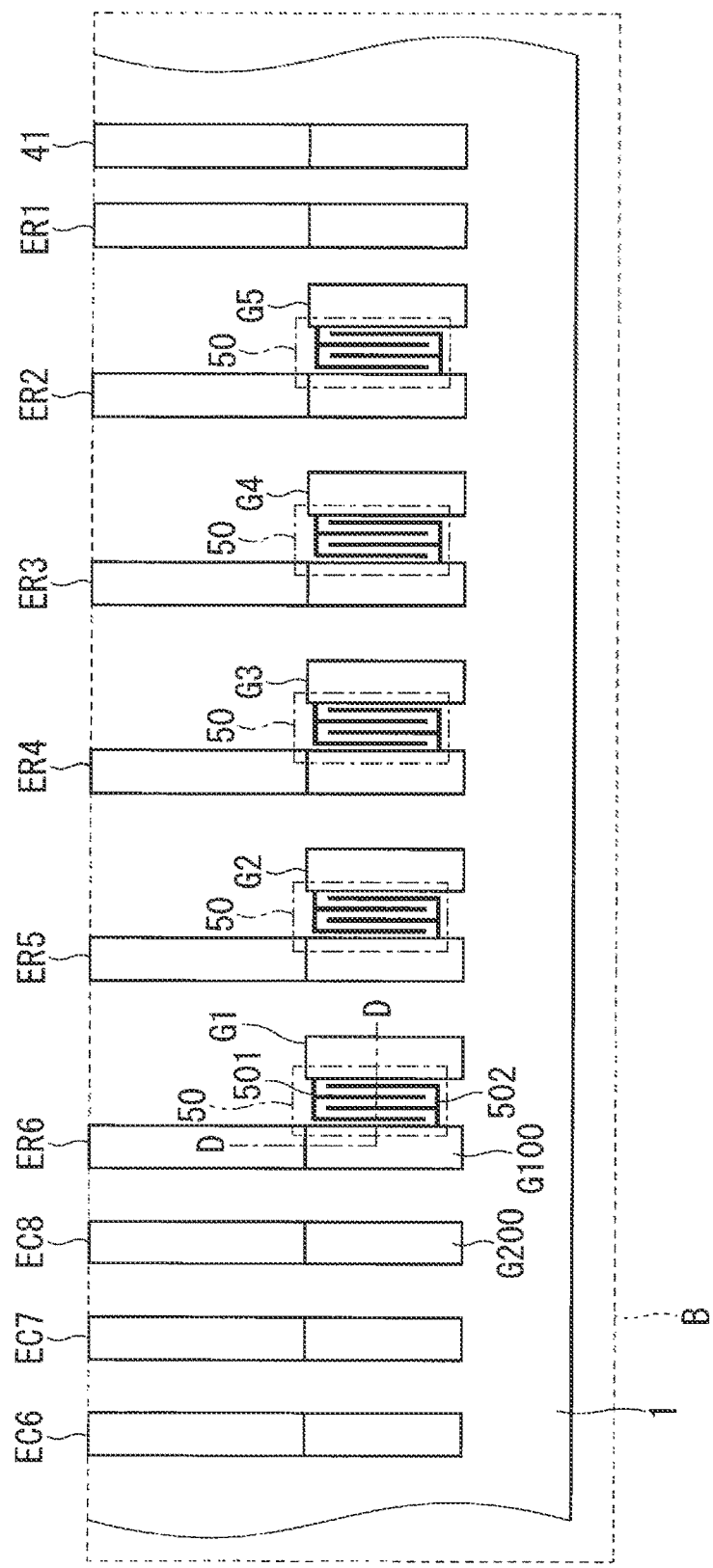
FIG. 6 is a plan view of a mounting region of a touch screen according to a first preferred embodiment.

FIG. 6 is an enlarged plan view of the area B surrounded by a broken line in FIG. 2. The area B is a mounting region where lead lines and a circuit board, which includes an integrated circuit (IC) for operating a touch panel, are connected with each other. FIG. 6 shows a part of the lead lines and a mounting terminal. Note that the mounting terminal is a terminal for mounting a flexible printed circuit (FPC).

FIG. 6 shows the lead lines ER1 to ER6, the outermost shielded wire 41, and the lead lines EC6 to EC8. The lead lines ER1 to ER6 and the outermost shielded wire 41 are connected to mounting terminals G100 at their one end, and the lead lines EC6 to ER8 are connected to mounting terminals G200 at their one end. Potential fixed terminals G1 to G5 are provided such that each of the potential fixed terminals G1 to G5 is spaced from and in parallel with one of the mounting terminals G100 that are respectively connected to the lead lines ER6 to ER2. FIG. 7 shows a cross section taken along the line D-D as viewed in a direction of the arrows in FIG. 6.

Figure 7:
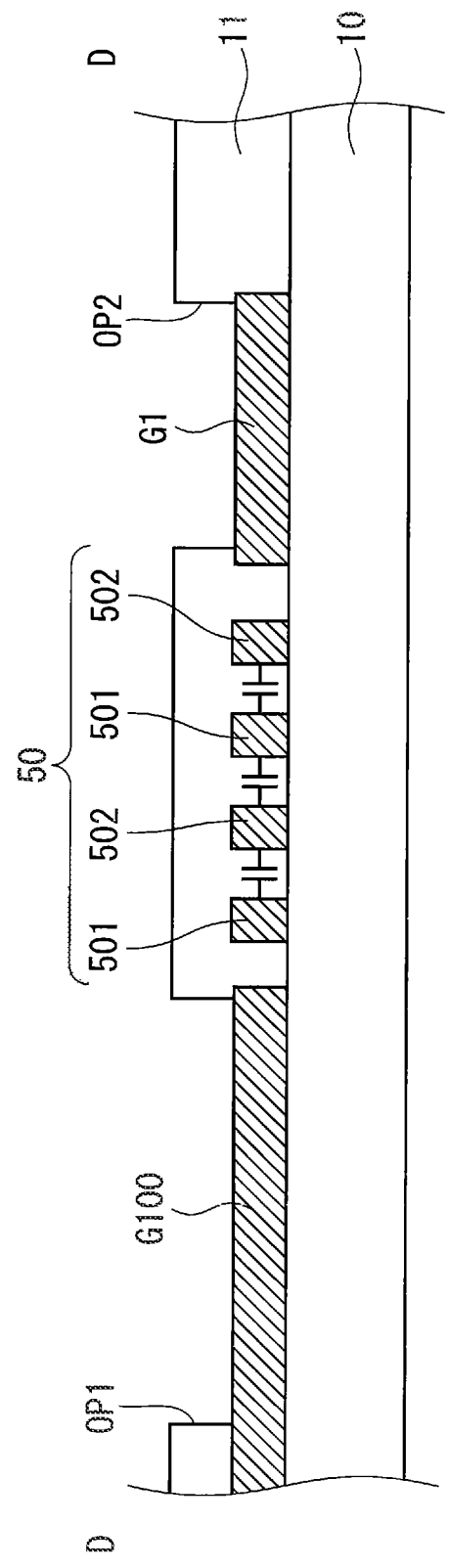
FIG. 7 is a sectional view of the mounting region of the touch screen according to the first preferred embodiment.

As shown in FIGS. 6 and 7, an additional capacitor 50 for applying electrostatic capacitance to each of the lead lines ER2 to ER6 is provided between each of the potential fixed terminals G1 to G5 and one of the mounting terminals G100. In the additional capacitor 50, a mounting terminal electrode 502 (first electrode) in a comb teeth shape, which is connected to one of the mounting terminals, and a potential fixed electrode 501 (second electrode) in a comb teeth shape, which is connected to one of the potential fixed terminals, are combined such that the comb teeth portion thereof are engaged with each other, and an electrostatic capacitance is produced between the comb teeth portions. Note that the additional capacitor 50 and the potential fixed terminal are not provided with respect to the outermost lead line ER1 and the outermost shielded wire 41.

The electrostatic capacitance can be adjusted by changing the length of the comb teeth portions of the potential fixed electrode 501 and the mounting terminal electrode 502 and the intervals of the electrodes, and this makes it possible to finely adjust the electrostatic capacitance.

Note that an electrode shape of the additional capacitor 50 is not limited to the comb teeth shape as described above, and may have any shape capable of producing an electrostatic capacitance, such as a linear shape or a hook shape.

The capacitance value at the additional capacitor 50 may be set at a value corresponding to a difference between the electrostatic capacitance of the outermost lead line ER1 and the electrostatic capacitance of the other lead lines, for example, a value corresponding to a difference between the electrostatic capacitance of the lead line ER1 and the electrostatic capacitance of the adjacent lead line ER2, or a value corresponding to a difference between the electrostatic capacitance of the lead line ER1 and an average value of the electrostatic capacitance of the lead lines ER2 to ER6.

Each of the potential fixed terminals G1 to G5 is a terminal for fixing a potential of the potential fixed electrode 501, and is connected to wirings (not shown) through an opening OP2 that penetrates an interlayer insulating film 11, as shown in FIG. 7, and is fixed to a constant potential, for example a ground potential. An opening OP1 that penetrates the interlayer insulating film 11 is provided on each of the mounting terminals G100, and each of the mounting terminals G100 is connected to the IC (not shown) through the opening OP1.

Note that as shown in FIG. 7, the potential fixed electrode 501 and the mounting terminal electrode 502 are provided in the same layer as the mounting terminals G100 and the potential fixed terminals G1 to G5. Accordingly, the potential fixed electrode 501 and the mounting terminal electrode 502 can be formed in the same forming step as the lead lines ER1 to ER6, the mounting terminals G100, and the potential fixed terminals G1 to G5, and thus an increase of manufacturing steps caused by providing the additional capacitor 50 can be avoided.

As described above, the additional capacitor 50 for applying electrostatic capacitance is respectively provided for each of the lead lines ER2 to ER6 other than the outermost lead line ER1. Accordingly, a deviation of the electrostatic capacitance produced between the lead line ER1 and the other lead lines can be reduced, and thus degradation of detection sensitivity can be suppressed.

Since the electrostatic capacitance is adjusted in the mounting region, it is not necessary to enlarge a frame region as compared to a case in which an adjusting region of the electrostatic capacitance is provided in the frame region, and thus it becomes possible to handle a narrow frame.

Since the electrostatic capacitance values at the additional capacitor 50 to be applied to the lead lines ER2 to ER6 are set at an equal value, manufacturing steps including a design step can be simplified as compared to a case in which the electrostatic capacitance values are set individually at different values.

Note that the size of the additional capacitor 50 is set for example such that the length between each of the potential fixed terminals and a corresponding one of the mounting terminals is about 0.3 mm, and the length in an extending direction of the potential fixed terminals (and the mounting terminals) is about 1.0 mm. The arrangement interval between the potential fixed electrode 501 and the mounting terminal electrode 502 may be about 3 mm, and the width of each of the electrodes is 3 μm.

<First Modification>

A structure of a first modification of the touch screen 1 according to the first preferred embodiment will be described below with reference to FIG. 8. Note that in FIG. 8, the same components as those described with reference to FIG. 6 are denoted by the same reference signs, and redundant descriptions are omitted.

Figure 8:
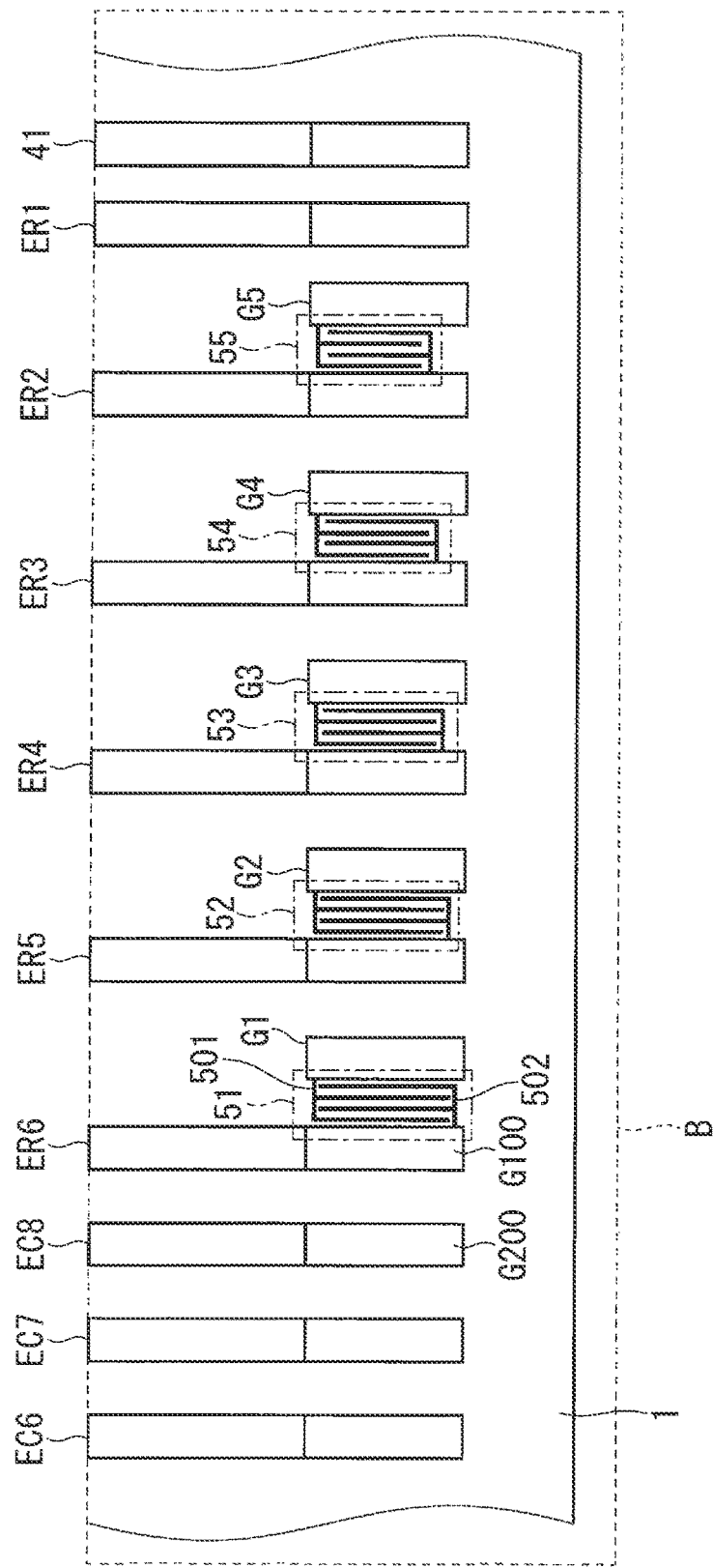
FIG. 8 is a plan view of a mounting region of a touch screen according to a first modification of the first preferred embodiment.

As shown in FIG. 8, according to the first modification, additional capacitors 51 to 55 having different electrostatic capacitance values are provided between each of the potential fixed terminals G1 to G5 and one of the mounting terminals G100. Specifically, an additional capacitor 51 is provided between the mounting terminal G100 of the lead line ER6 and the potential fixed terminal G1, an additional capacitor 52 is provided between the mounting terminal G100 of the lead line ER5 and the potential fixed terminal G2, an additional capacitor 53 is provided between the mounting terminal G100 of the lead line ER4 and the potential fixed terminal G3, an additional capacitor 54 is provided between the mounting terminal G100 of the lead line ER3 and the potential fixed terminal G4, and an additional capacitor 55 is provided between the mounting terminal G100 of the lead line ER2 and the potential fixed terminal G5.

The sizes of the comb teeth shaped electrodes are varied so that the electrostatic capacitance values at the additional capacitors 51 to 55 increase as their respective distances from the outermost lead line ER1 increase. Specifically, the additional capacitors 51 to 55 are configured such that the electrostatic capacitance value of the additional capacitor 55 is minimized, and the electrostatic capacitance value of the additional capacitor 51 is maximized. This is because the electrostatic capacitance values of the lead lines decrease as their respective distances from the lead line ER1 increase, and the electrostatic capacitance values at the additional capacitors 51 to 55 are set to compensate their respective differences from the electrostatic capacitance values of the lead lines. This structure reduces a deviation of the electrostatic capacitance values between the lead lines and can improve the detection sensitivity.

<Second Modification>

A second modification of the touch screen 1 according to the first preferred embodiment will be described below with reference to FIG. 9. Note that in FIG. 9, the same components as those described with reference to FIG. 6 are denoted by the same reference signs, and redundant descriptions are omitted.

Figure 9:
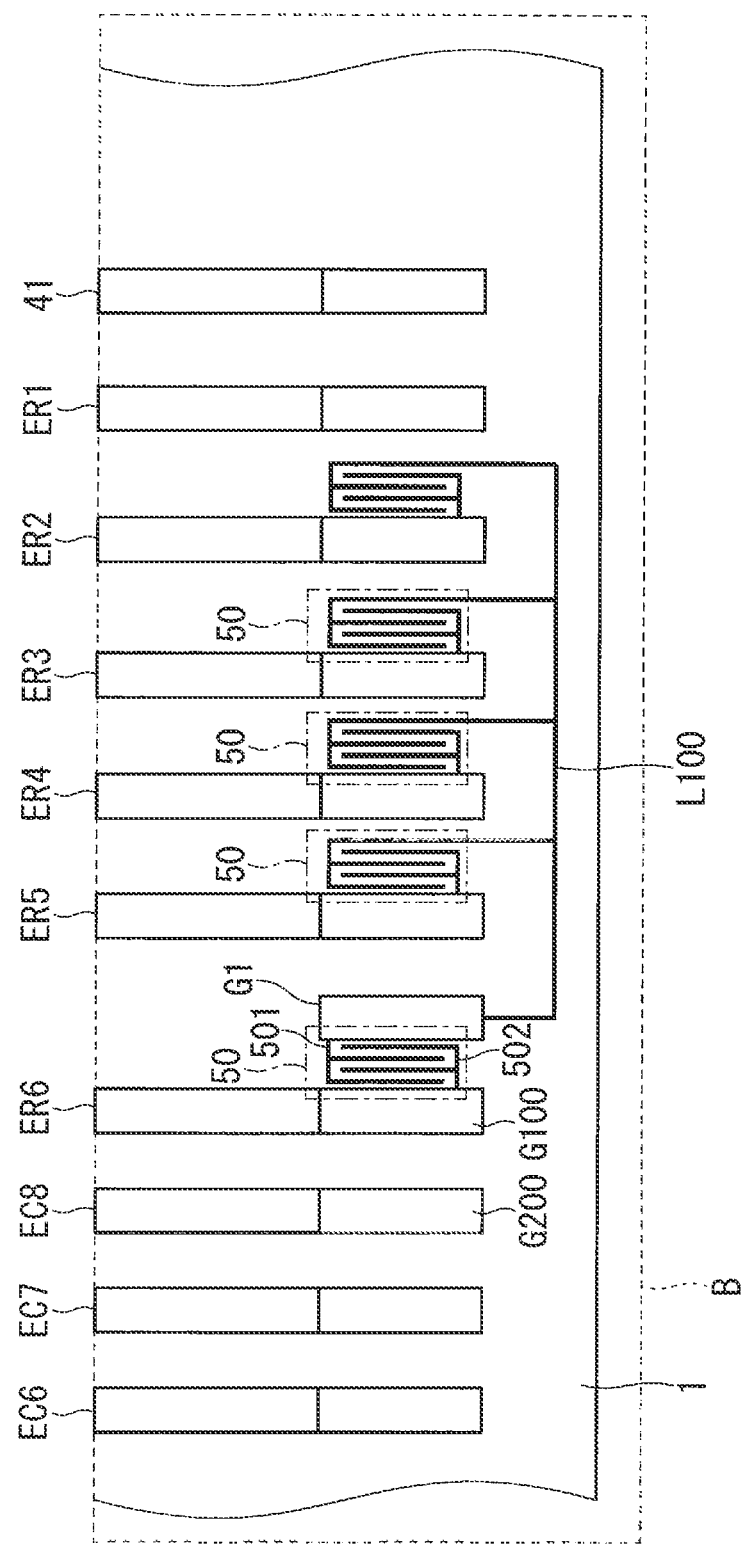
FIG. 9 is a plan view of a mounting region of a touch screen according to a second modification of the first preferred embodiment.

As shown in FIG. 9, according to the second modification, a potential fixed terminal is not provided at every one of the mounting terminals G100, but is provided in parallel to any one of the mounting terminals G100 and all of potential fixed electrodes are commonly connected to the potential fixed terminal.

Specifically, as exemplified in FIG. 9, a potential fixed terminal G1 is provided between the mounting terminal G100 of the lead line ER6 and the mounting terminal G100 of the lead line ER5, and a mounting terminal electrode 502 is connected to the mounting terminal at one of the additional capacitors 50 between the mounting terminal G100 of the lead line ER6 and the potential fixed terminals G1, and a potential fixed electrode 501 is connected to the potential fixed terminal. At the other additional capacitors 50, mounting terminal electrodes 502 are respectively connected to the mounting terminals and potential fixed electrodes 501 are commonly connected to a conductive pattern L100, and the conductive pattern L100 is connected to the potential fixed terminal G1. As the structures are different, one of the additional capacitors 50 between the mounting terminal G100 of the lead line ER6 and the potential fixed terminal G1 may be referred to as a first additional capacitor, and the other additional capacitors 50 may be referred to as a second additional capacitor.

The conductive pattern L100 is provided in the same layer as the potential fixed electrode 501 and the mounting terminal electrode 502, and thus can be formed in the same forming step as the potential fixed electrode 501 and the mounting terminal electrode 502.

As described above, a potential fixed terminal is not provided at every one of the mounting terminals G100, but is provided any one of the mounting terminals G100, and all of the potential fixed electrodes are commonly connected to the potential fixed terminal. Accordingly, the potential fixed electrodes can be integrated and the number of the mounting terminals is reduced, and thus, a cost reduction can be achieved due to the width reduction of the FPC that connects the touch screen 1 with a circuit board (not shown).

Since the potential fixed electrodes are integrated, an interval between the terminals (terminal pitch) of the FPC can be reduced by about 0.2 to 0.5 mm per one interval, the width of the overall FPC can be expected to be reduced by about ten-odd millimeters.

<Third Modification>

A third modification of the touch screen 1 according to the first preferred embodiment will be described below with reference to FIG. 10. Note that in FIG. 10, the same components as those described with reference to FIGS. 8 and 9 are denoted by the same reference signs, and redundant descriptions are omitted.

Figure 10:
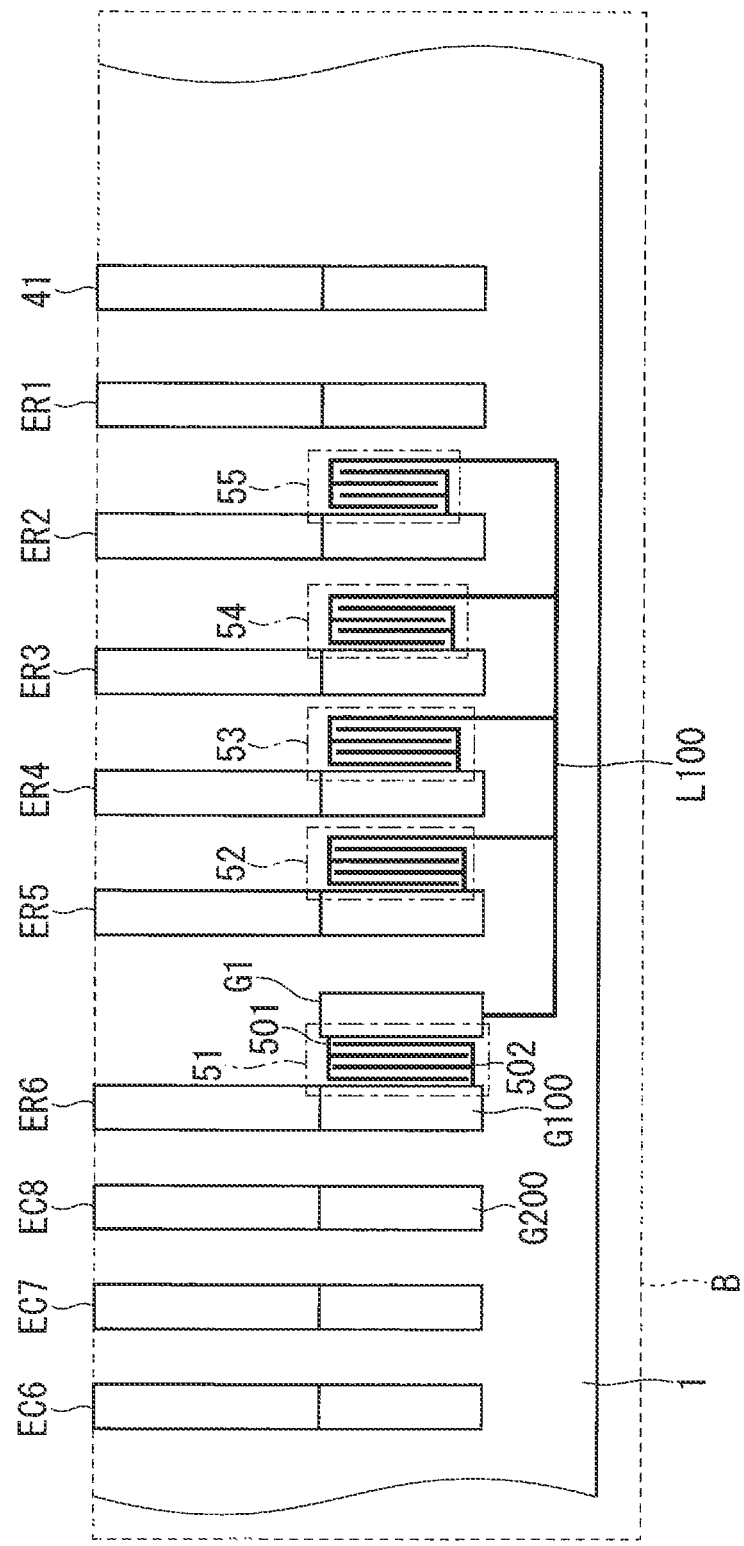
FIG. 10 is a plan view of a mounting region of a touch screen according to a third modification of the first preferred embodiment.

As shown in FIG. 10, according to the third modification, the sizes of the comb teeth shaped electrodes are varied so that the electrostatic capacitance values at the additional capacitors 51 to 55 increase as their respective distances from the outermost lead line ER1 increase, similarly to the first modification illustrated with reference to FIG. 8. A potential fixed terminal is not provided at every one of the mounting terminals G100, similarly to the second modification illustrated with reference to FIG. 9. A potential fixed terminal G1 is provided between the mounting terminal G100 of the lead line ER6 and the mounting terminal G100 of the lead line ER5. At the additional capacitor 51 between the mounting terminal G100 of the lead line ER6 and the potential fixed terminal G1, the mounting terminal electrode 502 is connected to a mounting terminal and the potential fixed electrode 501 is connected to the potential fixed terminal. At the additional capacitors 52 to 55, the mounting terminal electrode 502 is connected to a mounting terminal and the potential fixed electrode 501 is commonly connected to the conductive pattern L100, the conductive pattern L100 is connected to the potential fixed terminal G1.

The electrostatic capacitance values of the lead lines decrease as their respective distances from the lead line ER1 increase, and the electrostatic capacitance values at the additional capacitors 51 to 55 are set to compensate their respective differences from the electrostatic capacitance values of the lead lines. This structure further reduces a deviation of the electrostatic capacitance values between the lead lines and can improve the detection sensitivity. In addition, since the potential fixed electrodes are integrated and the number of the mounting terminals is reduced, and thus a cost reduction can be achieved due to the width reduction of the FPC that connects the touch screen 1 with a circuit board (not shown).

Second Preferred Embodiment

Figure 11:
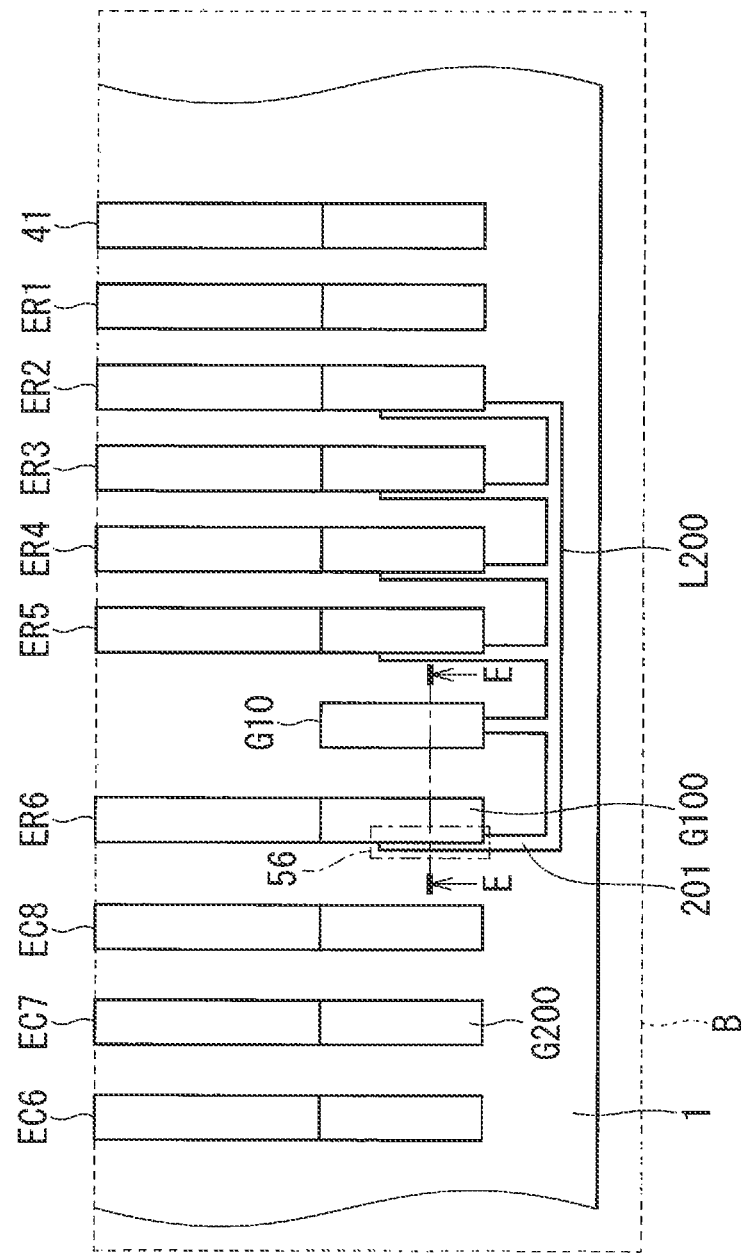
FIG. 11 is a plan view of a mounting region of a touch screen according to a second preferred embodiment.
Figure 12:
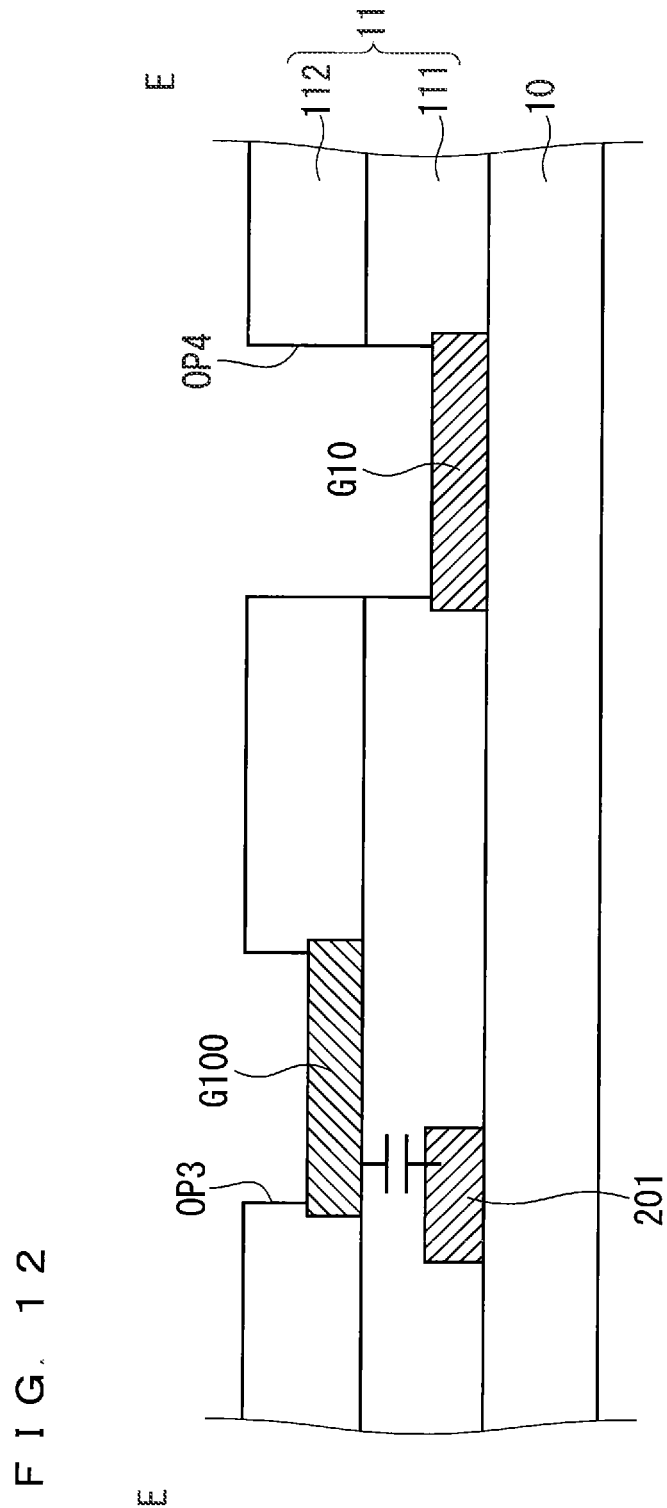
FIG. 12 is a sectional view of the mounting region of the touch screen according to the second preferred embodiment.

A structure of the touch screen 1 according to the second preferred embodiment is described below with reference to FIGS. 2, 11, and 12. FIG. 11 is an enlarged plan view of the area B surrounded by a broken line in FIG. 2. The area B is a mounting region where lead lines and a circuit board, which includes an integrated circuit (IC) for operating a touch panel, are connected with each other. FIG. 11 shows a part of the lead lines and a mounting terminal. FIG. 12 illustrates a structure of a cross section taken along the line E-E as viewed in a direction of the arrows in FIG. 11.

FIG. 11 shows the lead lines ER1 to ER6, the outermost shielded wire 41, and the lead lines EC6 to EC8. The lead lines ER1 to ER6 and the outermost shielded wire 41 are connected to mounting terminals G100 at their one end, and the lead lines EC6 to ER8 are connected to mounting terminals G200 at their one end. Potential fixed electrodes 201, each of which applies an electrostatic capacitance to one of the lead lines ER2 to ER6, are respectively provided below the mounting terminals G100 each of which is connected to one of the lead lines ER6 to ER2, in the extending direction of the mounting terminals G100. Additional capacitors 56 are provided in areas in which the potential fixed electrodes 201 are formed, but are not provided for the outermost lead line ER1 and the outermost shielded wire 41.

A potential fixed terminal G10, which is formed in the same layer as the potential fixed electrodes 201, is provided between the mounting terminal G100 of the lead line ER6 and the mounting terminal G100 of the lead line ER5, the potential fixed electrodes 201 under the lead lines ER2 to ER6 are commonly connected to the conductive pattern L200, and the conductive pattern L200 is connected to the potential fixed electrodes 201. Note that the potential fixed electrodes 201 and the conductive pattern L200 are visible, since the interlayer insulating film 11 is formed of a transparent insulating film.

As shown in FIG. 12, according to the second preferred embodiment, the interlayer insulating film 11 is formed of a laminated film including a transparent substrate 10 and a lower-layer film 111 and an upper-layer film 112 stacked in this order on the transparent substrate 10. The upper-layer film 112 includes the lead lines ER1 to ER6 including the mounting terminals G100 and the outermost shielded wire 41, and the lower-layer film 111 includes the potential fixed electrode 201, the conductive pattern L200, and the potential fixed terminal G10.

As shown in FIG. 12, an electrostatic capacitance is formed at a portion where the mounting terminal G100 and the potential fixed electrode 201 vertically overlap with each other. In this case, the electrostatic capacitance can be adjusted by varying the area of the portion where the mounting terminal G100 and the potential fixed electrode 201 overlap with each other.

Note that an opening OP4 that penetrates the upper-layer film 112 and the lower-layer film 111 is provided on the potential fixed terminal G10, the potential fixed terminal G10 is connected to a wiring (not shown) through the opening OP4, and fixed to a constant potential, for example to a ground potential. An opening OP3 that penetrates the upper-layer film 112 is provided on the mounting terminal G100, and the mounting terminal G100 is connected to the IC (not shown) through the opening OP3.

As described above, an additional capacitor 56 for applying an electrostatic capacitance is provided for each of the lead lines ER2 to ER6 other than the outermost lead line ER1. Accordingly, a deviation of an electrostatic capacitance produced between the lead line ER1 and the other lead lines can be reduced, degradation of the detection sensitivity can be suppressed.

Since the electrostatic capacitance is adjusted in the mounting region, it is not necessary to enlarge a frame region as compared to a case in which an adjusting region of the electrostatic capacitance is provided in the frame region, and thus it becomes possible to handle a narrow frame.

Since the electrostatic capacitance values at the additional capacitor 56 to be applied to the lead lines ER2 to ER6 are set at an equal value, manufacturing steps including a design step can be simplified as compared to a case in which the electrostatic capacitance values are set individually at different values.

Since the additional capacitor 56 is formed by vertically overlapping the mounting terminal G100 with the potential fixed electrode 201, an area for producing an electrostatic capacitance can be made small. In addition, since the potential fixed electrodes are integrated, the number of the mounting terminals is reduced, and thus a cost reduction can be achieved due to the width reduction of the FPC that connects the touch screen 1 with a circuit board (not shown). Note that when the structure according to the second preferred embodiment is employed, an interval between the terminals (terminal pitch) of the FPC can be reduced to about 0.1 mm.

<First Modification>

A structure of a first modification of the touch screen 1 according to the second preferred embodiment will be described below with reference to FIG. 13. Note that in FIG. 13, the same components as those described with reference to FIG. 11 are denoted by the same reference signs, and redundant descriptions are omitted.

Figure 13:
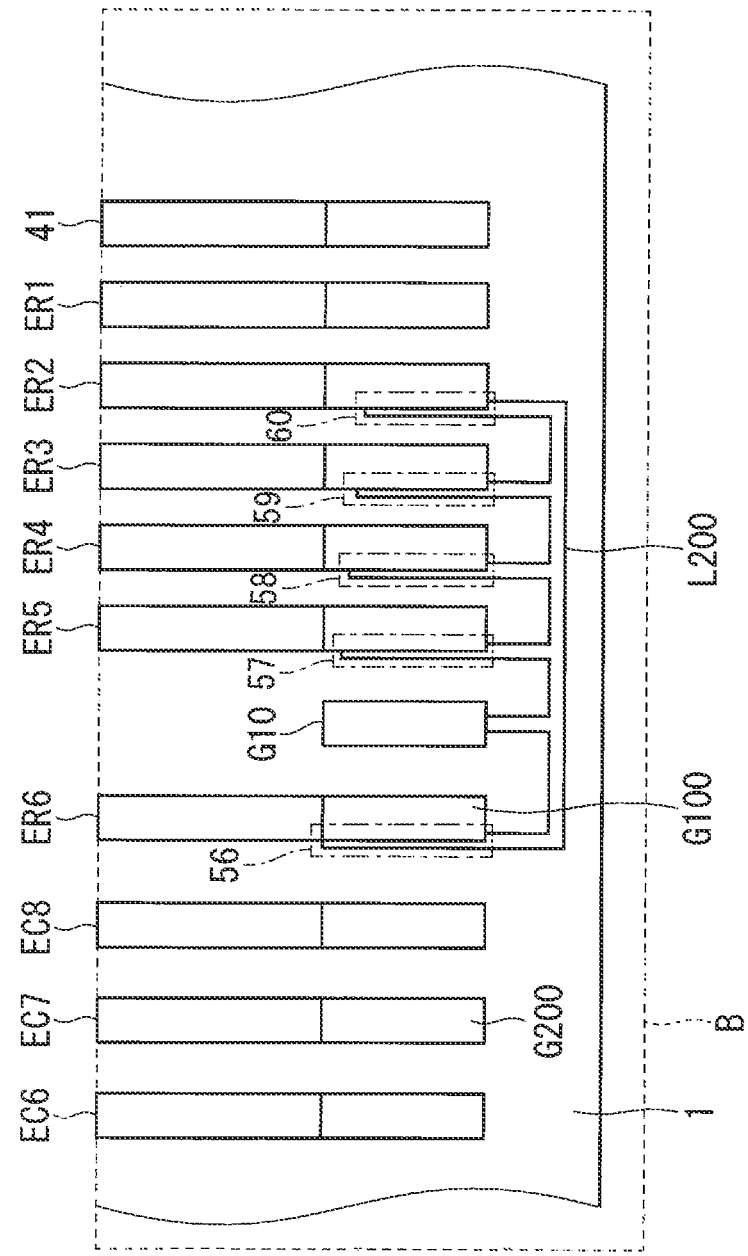
FIG. 13 is a plan view of a mounting region of a touch screen according to a first modification of the second preferred embodiment.

As shown in FIG. 13, according to the first modification, additional capacitors 56 to 60 having different electrostatic capacitance values are provided for each of the mounting terminals G100. Specifically, the additional capacitor 56 is provided for the mounting terminal G100 of the lead line ER6, the additional capacitor 57 is provided for the mounting terminal G100 of the lead line ER5, the additional capacitor 58 is provided for the mounting terminal G100 of the lead line ER4, the additional capacitor 59 is provided for the mounting terminal G100 of the lead line ER3, and the additional capacitor 60 is provided for the mounting terminal G100 of the lead line ER2.

The length of each of the potential fixed electrodes 201 is varied so that the electrostatic capacitance values at the additional capacitors 56 to 60 increase as their respective distances from the outermost lead line ER1 increase. Specifically, the length of each of the potential fixed electrodes 201 is adjusted so that the electrostatic capacitance value of the additional capacitor 56 is maximized, and the electrostatic capacitance value of the additional capacitor 60 is minimized.

The electrostatic capacitance values of the lead lines decrease as their respective distances from the lead line ER1 increase, and the electrostatic capacitance values at the additional capacitors 56 to 60 are set to compensate their respective differences from the electrostatic capacitance values of the lead line. This structure further reduces a deviation of the electrostatic capacitance values between the lead lines and can improve the detection sensitivity.

<Second Modification>

A structure of a second modification of the touch screen 1 according to the second preferred embodiment will be described below with reference to FIGS. 14 and 15. FIG. 15 shows a structure of a cross section taken along the line F-F in a direction of the arrows in FIG. 14. Note that in FIGS. 14 and 15, the same components as those described with reference to FIGS. 12 and 13 are denoted by the same reference signs, and redundant descriptions are omitted.

Figure 14:
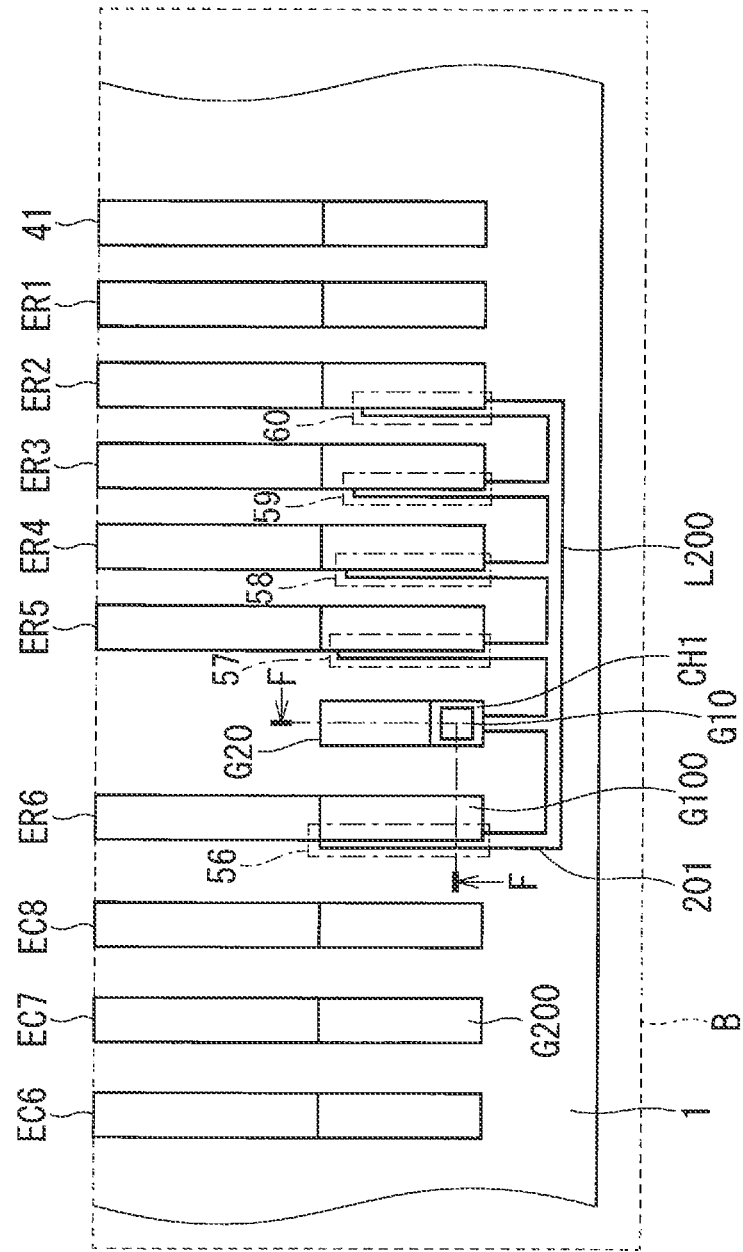
FIG. 14 is a plan view of a mounting region of a touch screen according to a second modification of the second preferred embodiment.
Figure 15:
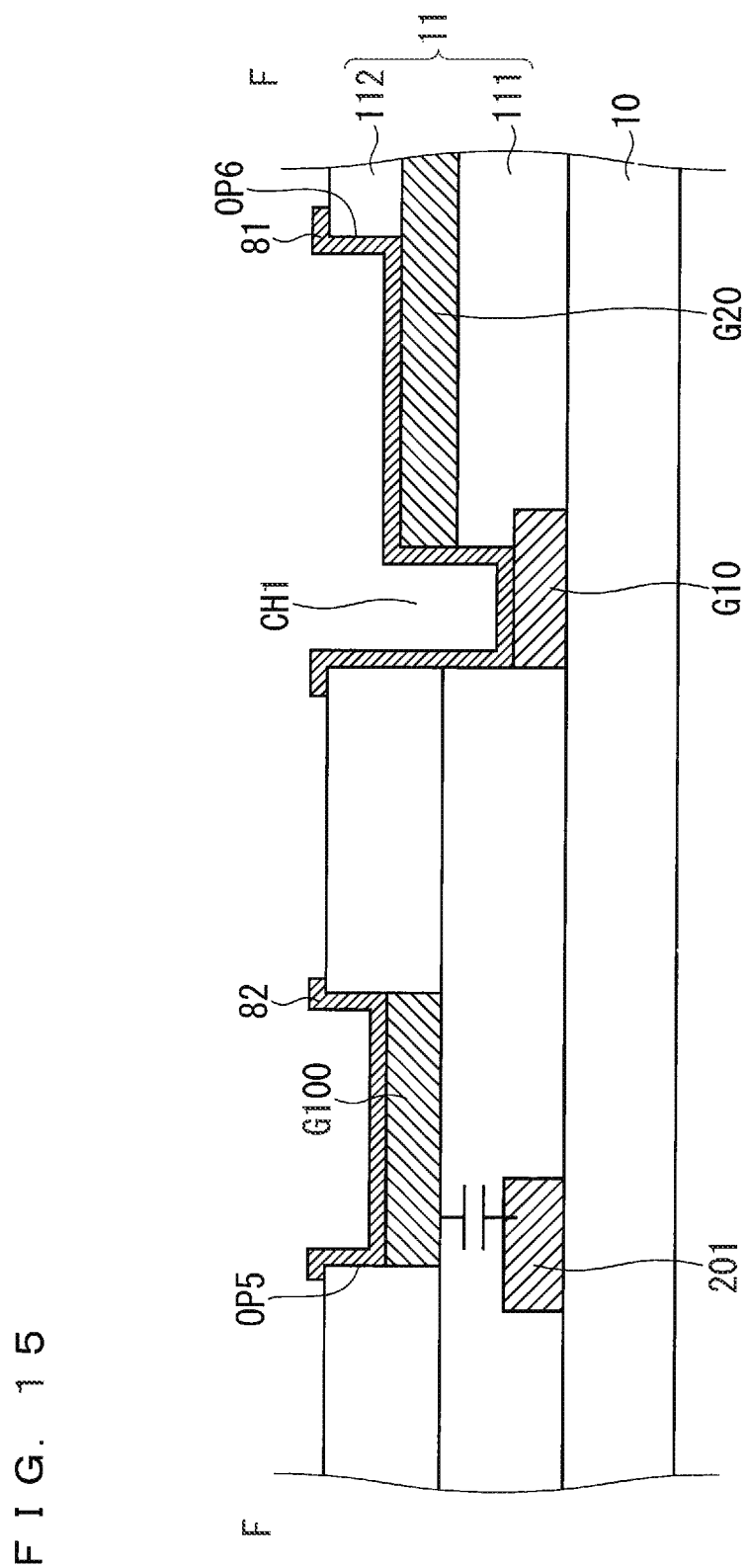
FIG. 15 is a sectional view of the mounting region of the touch screen according to the second modification of the second preferred embodiment

As shown in FIG. 14, according to the second modification, additional capacitors 56 to 60 having different electrostatic capacitance values are provided for the mounting terminals G100, similarly to the first modification as described with reference to FIG. 13. The length of each of the potential fixed electrodes 201 is adjusted so that the electrostatic capacitance values at the additional capacitors 56 to 60 increase as their respective distances from the outermost lead line ER1 increase.

A potential fixed terminal G10, which is formed in the same layer as the potential fixed electrodes 201, is provided between the mounting terminal G100 of the lead line ER6 and the mounting terminal G100 of the lead line ER5, the potential fixed electrodes 201 under the lead lines ER2 to ER6 are commonly connected to the conductive pattern L200, and the conductive pattern L200 is connected to the potential fixed electrodes 201. As shown in FIG. 15, an upper potential fixed terminal G20 is provided in the upper-layer film 112 so as to overlap a part of the potential fixed terminal G10.

A contact hole CH1 that penetrates the upper-layer film 112 and the lower-layer film 111 is provided above the potential fixed terminal G10, and an opening OP6 that penetrates the upper-layer film 112 is provided on the upper potential fixed terminal G20. The inside of the contact hole CH1 and the inside of the opening OP6 are covered by a conductive film 81 formed on the upper-layer film 112, and the potential fixed terminal G10 and the upper potential fixed terminal G20 are electrically connected with each other through the conductive film 81. The conductive film 81 is a wiring for fixing the potential of the potential fixed terminal G10.

An opening OP5 that penetrates the upper-layer film 112 is provided on each of the mounting terminals G100, and the inside of the opening OP5 is covered by the conductive film 82, and each of the mounting terminals G100 is connected to an integrated circuit (IC) (not shown) through the conductive film 82. The conductive films 81 and 82 are formed of a transparent wiring material such as indium tin oxide (ITO), or a metal wiring material such as aluminum or copper. Note that the lead lines ER1 to ER6, EC1 to EC8, potential fixed terminals G1 to G5, G10, the upper potential fixed terminal G20, and the mounting terminals G100 are formed of an aluminum-based metal wiring material, an alloy such as chrome, copper, silver or the like, or a multilayer metal wiring material in which aluminum or the like is laminated on any of these alloys.

With this structure, the potential of the potential fixed terminal G10 is fixed through the contact hole CH1 and the opening OP6. Thus, a mounting failure caused by a level difference is suppressed and a cost reduction due to improvement of a yield can be expected as compared to a structure in which the potential fixed terminal G10 is directly connected to the wiring on the upper-layer film 112.

The electrostatic capacitance of each of the additional capacitors is set to reduce a deviation of the electrostatic capacitance between the lead lines. This structure can improve detection sensitivity by reducing the deviation of the electrostatic capacitance between the lead lines. In addition, since the potential fixed electrodes are integrated and the number of the mounting terminals is reduced, and thus a cost reduction can be achieved due to the width reduction of the FPC that connects the touch screen 1 with a circuit board (not shown).

<Difference of Effects as Compared to Comparative Example>

In the first and second preferred embodiments as described above, the structures to reduce the deviation of the electrostatic capacitance produced between the lead line ER1 and the other lead lines among the lead lines ER1 to ER6 connected to the row-direction wirings 21 are described. With respect to the lead lines EC1 to EC8 connected to the column-direction wirings 31, a deviation of the electrostatic capacitance may be produced between the lead line CR1 and the other lead lines. Accordingly, a structure to reduce the deviation of the electrostatic capacitance, i.e., a structure in which the electrostatic capacitance is adjusted by the additional capacitor may be applied to the lead lines EC2 to EC8. One example of the effects obtained by the structure in which the electrostatic capacitance values at the lead lines of the row-direction wirings and the column-direction wirings are adjusted by additional capacitors will be described below.

To confirm the effects, a sample in which a touch screen having ten row-direction wirings R1 to R10 and fourteen column-direction wirings C1 to C14 is mounted on a liquid crystal display including a front frame having conductivity and being grounded is prepared and mutual capacitance values of the wirings of the touch screen are measured.

A sample of a conventional touch screen in which electrostatic capacitance values are not adjusted by the additional capacitors is also prepared as a comparative example.

Figure 16:
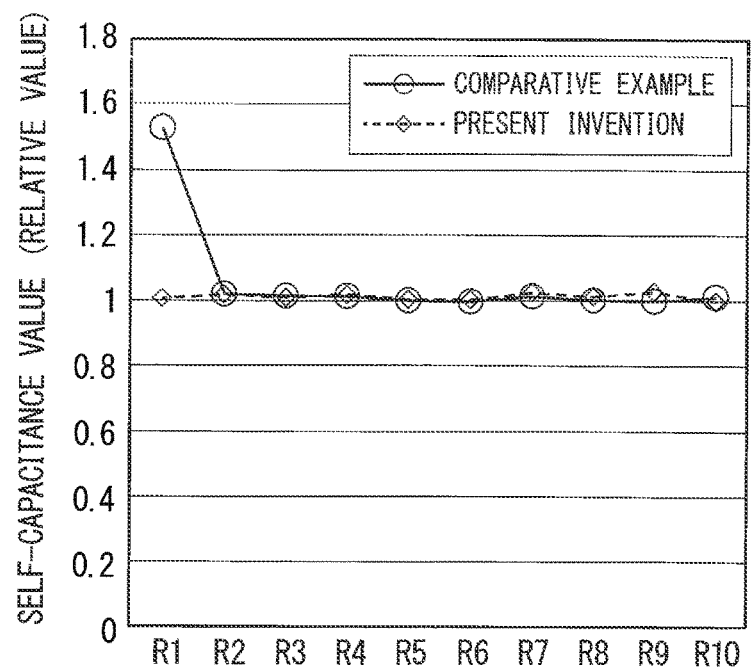
FIG. 16 is a graph showing self-capacitance values of row-direction wirings of the touch screen.

FIG. 16 is a graph showing relative values of self-capacitance at the row-direction wirings R1 to R10 of the touch screens according to the comparative example and the first preferred embodiment. Note that the relative values of the self-capacitance are expressed relative to a self-capacitance value at the row-direction wiring R5 of the touch screen according to the comparative example taken as 1.

As shown in FIG. 16, according to the comparative example, all of the relative values of the self-capacitance of the row-direction wirings R2 to R10 are nearly uniform at approximately 1, but the relative value of the self-capacitance of the outermost row-direction wiring R1 is offset at about 1.5. On the other hand, in the touch screen according to the first preferred embodiment, it is clear that the relative values of the self-capacitance at all of the row-direction wirings including the outermost row-direction wiring R1 are nearly uniform at approximately 1.

Figure 17:
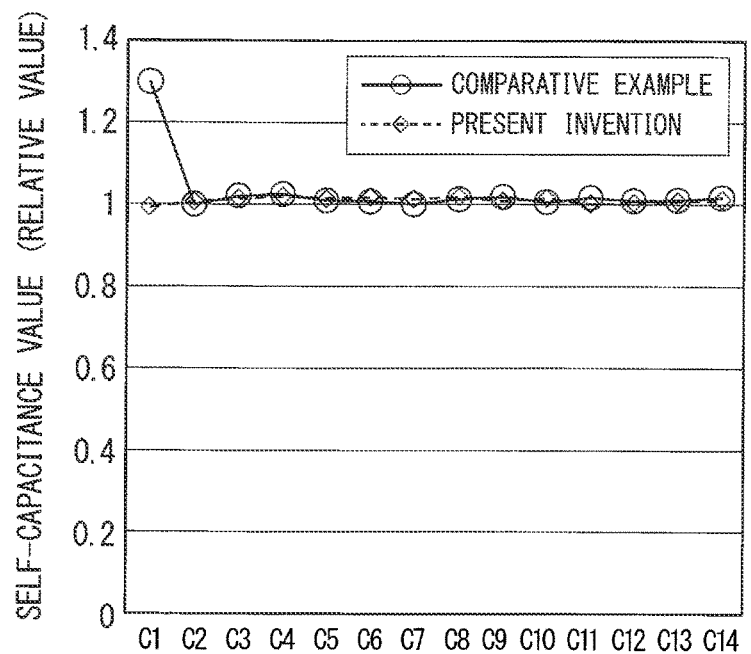
FIG. 17 is a graph showing self-capacitance values of column-direction wirings of the touch screen.

FIG. 17 is a graph showing relative values of self-capacitance of the column-direction wirings C1 to C14 of a touch screen according to the comparative example and a touch screen in which the same structure as the first preferred embodiment for reducing a deviation of the electrostatic capacitance is provided for lead lines of the column-direction wirings. Note that the relative values of the self-capacitance are expressed relative to a self-capacitance value at the column-direction wiring C7 of the touch screen according to the comparative example taken as 1.

As shown in FIG. 17, according to the comparative example, all of the relative values of the self-capacitance of the column-direction wirings C2 to C14 are nearly uniform at approximately 1, but the relative value of the self-capacitance of the outermost column-direction wiring C1 is offset at about 1.3. On the other hand, it is clear that the relative values of the self-capacitance at all of the column-direction wirings including the outermost column-direction wiring C1 are nearly uniform at approximately 1 in the touch screen in which the structure for reducing the deviation of the electrostatic capacitance is provided.

Although the deviation of the electrostatic capacitance between the outermost lead lines ER1 and CR1 and the other lead lines is described above, a deviation may be assumed to be produced between not only the outermost lead line but also an inner lead line and the other lead lines accompanied by upsizing of display devices. In such a case, a structure in which additional capacitance values are not applied to some inner lead lines in addition to the outermost lead line is employed.

Third Preferred Embodiment

Figure 18:
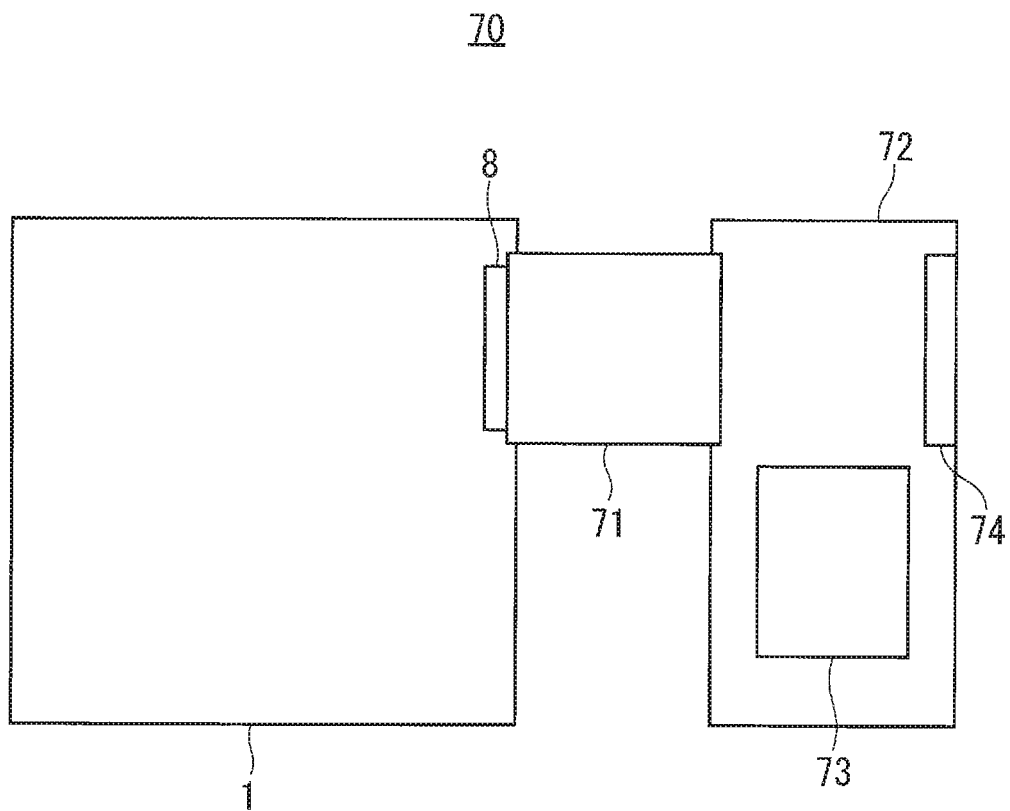
FIG. 18 is a plan view schematically showing a structure of the touch panel.

FIG. 18 is a plan view schematically showing a structure of a touch panel 70 of the third preferred embodiment according to the present invention. The touch panel 70 includes the touch screen 1 according to the first preferred embodiment shown in FIG. 1, a flexible printed circuit 71 (FPC), and a controller substrate 72.

The touch screen 1 functions as a main component of the touch panel 70 by allowing end portions of the row-direction wirings 21 and the column-direction wirings 31 of the touch screen 1 and the controller substrate 72 to be electrically connected with each other through the flexible printed circuit 71.

A touched-position detection processing circuit 73 is mounted on the controller substrate 72. The touched-position detection processing circuit 73 detects a touch capacitance formed of electrostatic capacitance between an indicator and the touch screen 1 by applying a signal voltage, and calculates a touched position on the touch screen 1 by the indicator based on the detection result. The controller substrate 72 includes an external connection terminal 74 configured to output the touched position calculated by the touched-position detection processing circuit 73 to an external processing device.

As described above, according to the third preferred embodiment, the touch panel 70 includes the touch screen 1 according to the first referred embodiment, and thus coupling between the outermost lead line of the touch screen 1 and a display module such as an LCD is reduced. This suppresses an offset of electrostatic capacitance of sensor capacitors due to the coupling, and thus a touch panel 70 in which uneven detection sensitivity of electrostatic capacitance is suppressed can be obtained.

A case in which the touch screen according to the first preferred embodiment is described above, the embodiment is not limited thereto, and the touch screen according to the second preferred embodiment can also exhibit the same effect.

Fourth Preferred Embodiment

A display device according to the fourth preferred embodiment of the present invention includes the above described touch panel 70 shown in FIG. 18 and a display module such as an LCD capable of displaying information. The touch panel 70 is disposed nearer to a user than a display screen of the display module. In other words, the display module is disposed on the touch screen of the touch panel 70 on a side opposite to the side to be touched by an indicator. This structure can provide a display device with a touch panel having a function of detecting a touched position indicated by a user.

As described above, the display device according to this preferred embodiment includes the touch panel 70 in which uneven detection sensitivity of electrostatic capacitance is reduced, and thus a display device with a touch panel in which uneven detection sensitivity of electrostatic capacitance is reduced can be obtained.

Fifth Preferred Embodiment

An electronic device according to the fifth preferred embodiment of the present invention includes the touch panel 70 according to the third preferred embodiment (FIG. 18), a display module such as an LCD, and a signal processing device (electronic processing section) (not shown) which is an electronic device.

The signal processing device receives a signal from the external connection terminal 74 of the touch panel 70 and outputs the received signal as a digital signal. Specifically, the signal processing device electrically performs a predetermined processing on information about the touched position detected by the touched-position detection processing circuit 73 of the touch panel 70. As described above, the signal processing device is connected to the touch panel 70, and thus an electronic device having a touch position detection function such as a digitizer, which outputs the information about the touched position detected by the touched-position detection processing circuit 73 of the touch panel 70 to an external signal processing device, can be obtained.

Note that the signal processing device may be installed in (or mounted on) the controller substrate 72 of the touch panel 70. In such a case, an electronic device having a touch position detection function with excellent versatility can be achieved by providing the signal processing device with an output function that meets a bus standard such as a universal serial bus (USB).

As described above, the electronic device according to this preferred embodiment includes the touch panel 70 in which uneven detection sensitivity of electrostatic capacitance is reduced, and thus a projected capacitive electronic device with a touch position detection function, in which uneven detection sensitivity of electrostatic capacitance is reduced, can be obtained.

Note that the present invention can freely combine the embodiments and appropriately change or omit the respective embodiments, within the scope of the present invention.

While the invention has been shown and described in detail, the foregoing description is in all aspects illustrative and not restrictive. It is therefore understood that numerous modifications and deviation can be devised without departing from the scope of the invention.

What is claimed is:

1. A touch screen comprising column-direction wirings extending in a column direction, row-direction wirings extending in a row direction orthogonal to said column direction, and detection cells provided in areas in which said column-direction wirings and said row-direction wirings are three-dimensionally intersect with each other, the touch screen further comprising:
    additional capacitors that are provided in a mounting region in which mounting terminals of a plurality of lead lines, each of which is connected to one of said column-direction wirings or one of said row-direction wirings, are mounted, and are configured to apply electrostatic capacitance to said plurality of lead lines; and
    at least one potential fixed terminal configured to fix a potential of one electrode of each of said additional capacitors.

2. The touch screen according to claim 1,
    wherein said additional capacitors are provided at said plurality of lead lines except an outermost lead line, and
    wherein a capacitance value of each of said additional capacitors is set at a value corresponding to a differential value of electrostatic capacitance between said outermost lead line and each of said plurality of lead lines except said outermost lead line.

3. The touch screen according to claim 2,
    wherein electrostatic capacitance values of said additional capacitors are equally set at a value with respect to said plurality of lead lines except said outermost lead line.

4. The touch screen according to claim 2,
    wherein electrostatic capacitance values of said additional capacitors are set such that the electrostatic capacitance values of said additional capacitors increase as their respective distances from said outermost lead line increase.

5. The touch screen according to claim 2,
    wherein said at least one potential fixed terminal includes a plurality of potential fixed terminals formed between the mounting terminals of said plurality of lead lines in an identical layer with said mounting terminals, and wherein each of said additional capacitors includes:

a first electrode connected to one of said mounting terminals; and a second electrode connected to one of said potential fixed terminals.

6. The touch screen according to claim 2, wherein said at least one potential fixed terminal is a potential fixed terminal formed in any one interval between the mounting terminals of said plurality of lead lines in an identical layer with said mounting terminals, and wherein each of said additional capacitors includes:

a first additional capacitor including a first electrode connected to one of said mounting terminals, and a second electrode connected to one of said potential fixed terminals; and a second additional capacitor including a first electrode connected to one of said mounting terminals, and a second electrode connected to a conductive pattern connected to said potential fixed terminal.

7. The touch screen according to claim 2, wherein said at least one potential fixed terminal is a potential fixed terminal formed in any one interval between the mounting terminals of said plurality of lead lines in a layer lower than said mounting terminals, and wherein each of said additional capacitors utilizes a corresponding one of said mounting terminals as a first electrode, and utilizes a potential fixed electrode, which is provided below the corresponding one of said mounting terminals and situated in an identical layer with said potential fixed terminal, as a second electrode, wherein said second electrode is connected to a conductive pattern formed in an identical layer with said potential fixed terminal and connected to said potential fixed terminal, and wherein an electrostatic capacitance is formed at a portion where said first electrode and said second electrode vertically overlaps with each other.

8. The touch screen according to claim 7, further comprising:

an upper potential fixed terminal provided above said potential fixed terminal and situated in an identical layer with said mounting terminal, wherein said potential fixed terminal is electrically connected with said upper potential fixed terminal.

9. A touch panel comprising:

the touch screen according to claim 1; and a touched-position detection circuit configured to detect a position touched by an indicator, which touches said touch screen, based on an electrostatic capacitance of said indicator with said row-direction wirings and said column-direction wirings.

10. A display device comprising:

the touch panel according to claim 9; and a display module that is disposed on said touch screen of said touch panel on a side opposite to a side to be touched by said indicator and is configured to display information.

11. An electronic device comprising:

the touch panel according to claim 9; and an electronic processing section configured to electrically perform a predetermined processing on information about said position detected by said touched-position detection circuit of said touch panel.

\* \* \* \* \*